(12) United States Patent
Barat

(10) Patent No.: US 10,930,965 B2
(45) Date of Patent: Feb. 23, 2021

(54) COLLAPSING FUEL CELL ISOLATOR FOR FUEL CELL AIRFLOW MANAGEMENT

(71) Applicant: ALTERGY SYSTEMS, Folsom, CA (US)

(72) Inventor: Phillip Alexander Barat, Mather, CA (US)

(73) Assignee: ALTERGY SYSTEMS, Folsom, CA (US)

( * ) Notice: Subject to any disclaimer, the term of this patent is extended or adjusted under 35 U.S.C. 154(b) by 65 days.

(21) Appl. No.: 15/792,684

(22) Filed: Oct. 24, 2017

(65) Prior Publication Data
US 2018/0115010 A1  Apr. 26, 2018

Related U.S. Application Data

(60) Provisional application No. 62/412,775, filed on Oct. 25, 2016.

(51) Int. Cl.
*H01M 8/2475* (2016.01)
*H01M 8/04007* (2016.01)
*H01M 8/04089* (2016.01)
*H01M 8/04014* (2016.01)

(52) U.S. Cl.
CPC ..... *H01M 8/2475* (2013.01); *H01M 8/04014* (2013.01); *H01M 8/04067* (2013.01); *H01M 8/04089* (2013.01); *H01M 2250/10* (2013.01); *Y02B 90/10* (2013.01)

(58) Field of Classification Search
None
See application file for complete search history.

(56) References Cited

U.S. PATENT DOCUMENTS

2010/0167154 A1*  7/2010  Ono .............. H01M 8/0247
429/457

FOREIGN PATENT DOCUMENTS

| JP | 2015228359 A | 12/2015 |  |
|---|---|---|---|
| KR | 1020110025036 A | 3/2011 |  |
| WO | 2009117998 A2 | 10/2009 |  |
| WO | WO-2009117998 A2 * | 10/2009 | .......... H01M 2/1061 |
| WO | 2016087568 A1 | 6/2016 |  |

OTHER PUBLICATIONS

Korean Intellectual Property Office (KIPO), International Search Report and Written Opinion dated Feb. 5, 2018, related PCT international application No. PCT/US2017/058154, pp. 1-16, with claims searched, pp. 17-21.

* cited by examiner

*Primary Examiner* — Daniel S Gatewood
(74) *Attorney, Agent, or Firm* — O'Banion & Ritchey LLP; John P. O'Banion

(57) ABSTRACT

A collapsible power generator (e.g., a fuel cell) isolating envelope for managing airflow in and out of a fuel cell, while providing thermal and electrical insulation between said fuel cell and the interior of a power plant enclosure. In a preferred embodiment, the collapsible fuel cell isolator is formed from a flat material into a parallelogram, allowing easy installation into the interior of said enclosure. Once the collapsible fuel cell isolating envelope is inside the enclosure, the collapsible fuel cell isolator may be opened up to a final rectangular form, and mounted in place such that a fuel cell may then be placed into the interior of the collapsible fuel cell isolating envelope. The collapsible nature of the fuel cell isolator allows the isolator to maximize the interior volume of the enclosure.

6 Claims, 2 Drawing Sheets

COLLAPSING FUEL CELL ISOLATOR FOR FUEL CELL AIRFLOW MANAGEMENT

CROSS-REFERENCE TO RELATED APPLICATIONS

This application claims priority to, and the benefit of, U.S. provisional patent application Ser. No. 62/412,775 filed on Oct. 25, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to electrical power generation, and more particularly to an enclosure for an electrical power generator.

2. Background Discussion

Outside plant equipment is often enclosed in weatherproof outdoor enclosures, utilizing grid electrical power as a primary power source. For critical applications, this primary source of grid power will often be augmented with a backup power source, such as batteries. In some cases, when the batteries cannot provide sufficient backup power for an extended time, an additional generator set with a fuel tank is sited next to the system. Because batteries often have short service lives or are otherwise unreliable, there is significant motivation to replace batteries with more attractive sources of backup power.

As alternative sources of electrical power generation such as fuel cells become more competitive relative to batteries, it becomes economically viable to replace batteries with fuel cells in backup power applications. An additional advantage is that the fuel cell system can often provide capabilities for longer backup power duration than batteries, eliminating the need for a separate generator and fuel tank external to the outside plant equipment. In new systems these fuel cells may be easily engineered for the application. However, in many existing systems (particularly those with a long field service life), the replacement of the batteries with a fuel cell can be problematic, unless the entire system is itself replaced. Since it can be quite costly to remove and replace the enclosure with a new one, there exists a need to install the fuel cell within the given enclosure. Unfortunately as the given enclosure may have space constraints, the installation of a given fuel cell may pose difficulties when accounting for the need to include an electrically and thermally insulating envelope member around the fuel cell, and to manage the air flow in and out over various cabinets.

It would therefore be advantageous to utilize an electrically and thermally insulating member which may be installed considering the given space constraints while still providing the required functionality.

BRIEF SUMMARY

An aspect of the present technology is a collapsible power generator (e.g. a fuel cell) isolating envelope for managing airflow in and out of a fuel cell, while providing thermal and electrical insulation between said fuel cell and the interior of a power plant enclosure. In a preferred embodiment, the collapsible fuel cell isolator is formed from a flat material into a parallelogram, allowing easy installation into the interior of said enclosure. Once the collapsible fuel cell isolating envelope is inside the enclosure, the collapsible fuel cell isolator may be opened up to a final rectangular form, and mounted in place such that a fuel cell may then be placed into the interior of the collapsible fuel cell isolating envelope. The collapsible nature of the fuel cell isolator allows the isolator to maximize the interior volume of the enclosure, as enclosure doors or other panels may restrict an isolator to be inserted into the enclosure in its operable state because the available opening for insertion of the isolator into the enclosure may be smaller than the available enclosure volume.

In a preferred embodiment, the collapsible fuel cell isolator, upon installation, may further act as an air guide for inlet air and exhaust gases in and out of the fuel cell, while thermally and electrically isolating the fuel cell from the interior of the enclosure.

Another aspect is a method for installing a collapsible fuel cell isolator into a power plant enclosure. The method comprises the steps of removing an existing power generator from the enclosure, folding a collapsible fuel cell isolating envelope into a parallelogram, inserting the fuel cell isolating envelope into an opening of the enclosure, and expanding collapsible fuel cell isolating envelope such that it forms a cavity within the enclosure volume. The collapsible fuel cell isolating envelope is then mounted into the enclosure and a replacement power generator (e.g. fuel cell or the line) is installed in the interior of the now rectangular collapsible fuel cell isolating envelope.

Another aspect is a method and system configured to provide a power generator replacement for an outside power plant in an enclosure, wherein an existing power generator (e.g. a battery, bank of batteries or like power source) is removed from the enclosure, an alternative power generator (e.g. a fuel cell) is placed in the enclosure in its stead. Prior to installation of the alternative power generator, a collapsible power generator (e.g. fuel cell) isolator is placed in a folded, collapsed configuration, into to the enclosure. Upon placement in the enclosure, the collapsed fuel cell isolator is expanded within the volume of the enclosure. The power generator is then inserted into the enclosure, wherein it is surrounded by the electrically and/or thermally insulating air management member/isolator.

Since the electrically and thermally insulating member/isolator takes up space, if attached to a fuel cell prior to installation in the given enclosure, the fuel cell and electrically and thermally insulating member may be too large to install together. However, if the electrically and thermally insulating member is configured in a collapsible manner, forming a collapsible fuel cell isolator, and installed prior to the fuel cell installation in the given enclosure, all the parts may be installed without difficulty. This may be done by first collapsing the fuel cell isolator, inserting it into the given enclosure, and expanding it into its mounting location within the given enclosure, followed by installation of the fuel cell inside the expanded fuel cell isolator. Furthermore, once installed, by forming a managing enclosure around the fuel cell, the collapsible fuel cell isolator can also provide functionality by guiding the flow of cooling and oxidant air flow into and out of the fuel cell.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
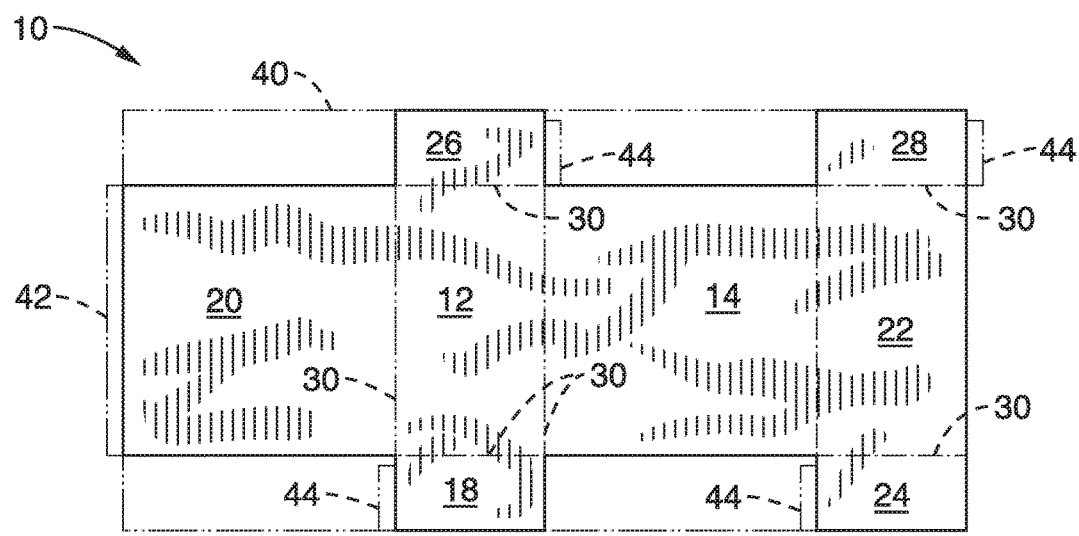
FIG. 1 is shows plan view of a flat foldable member (in unfolded configuration) for forming a collapsing fuel cell isolator in accordance with the present description.

FIG. 1 shows a flat foldable member 10 (in unfolded configuration) for forming a collapsible fuel cell isolator in accordance with the present description. FIG. 1 also illustrates a method of fabrication of the foldable member 10. Flat folded member 10 comprises a thin, planar sheet having a profile formed from a thin rectangular sheet 40 (e.g. via die cutting or other manufacturing process), and a plurality of fold lines 30 for forming walls of the collapsible fuel cell isolator. The fold lines 30 of the flat folded member 10 may comprise one or more scores, creases, cuts, or other means facilitating predictable folding along lines 30. The fold lines 30 are generated or otherwise reside at locations that provide extremities or bounds of one or more faces of the collapsible fuel cell isolator when folded into a rectangular form. The one or more faces include a first side face 14 and a second side face 20, each configured to fold upward from bottom face 12. A top face 22 folds upward from the other side of side face 14. A lower front flap 18 and lower rear flap 26 are also provided on opposing sides of bottom face 12 such that they may be folded upward from bottom face 12. An upper front flap 24 and upper rear flap 28 are also provided on opposing sides of top face 22 such that they may be folded upward from top face 22.

The foldable member 10 preferably comprises a flame retardant polymer providing thermal and electrical insulation. In one embodiment, the foldable member 10 has a thickness of less than 50 mm, and preferably in the range between 1 mm to 5 mm.

Figure 2:
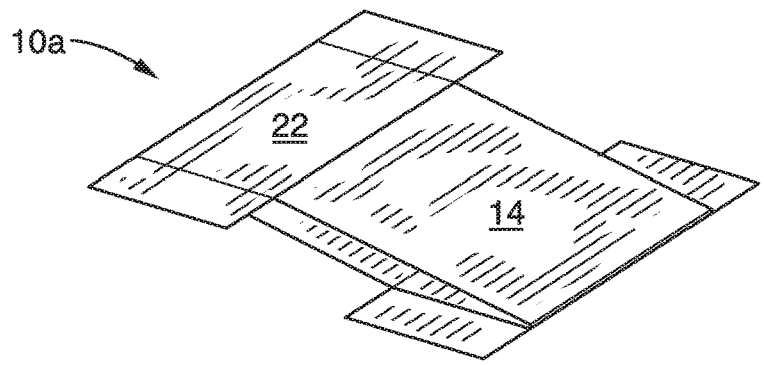
FIG. 2 is a perspective view of the foldable member of FIG. 1 folded into a formed collapsed fuel cell isolator, shown as a collapsed parallelogram.

In one embodiment, flat folding member 10 may optionally be provided with one or more tabs (e.g. tab 42 on an opposite side of second side face 20 from bottom face 20 or tabs 44 on lower front flap 18, lower rear flap 26, upper front flap 24 and upper rear flap 28) may also be provided for adhering, or otherwise fastening one or more faces (e.g. second side face 20 with top face 22) in a fixed position with respect to each other (see FIG. 2).

FIG. 2 shows a perspective view of the flat folded member 10 of FIG. 1 assembled into a collapsible isolator in the form of a folded parallelogram 10a. This may be achieved by joining top face 22 with side face 20 (FIG. 1) with tab 42 or other fastening means (e.g. a right angle fasting member or the like, not shown). Tabs 44 and lower front flap 18, lower rear flap 26, upper front flap 24 and upper rear flap 28 may remain unfolded at this time. As shown in FIG. 2, folded parallelogram 10a is in a compact form and may be suitable for insertion through a narrow opening. FIG. 2 illustrates folded parallelogram 10a in a partially collapsed state. However, it is appreciated that folded parallelogram 10a may be entirely collapsed, or any state of non-orthogonal wall orientation that allows folded parallelogram 10a to be of a smaller form.

Figure 3:
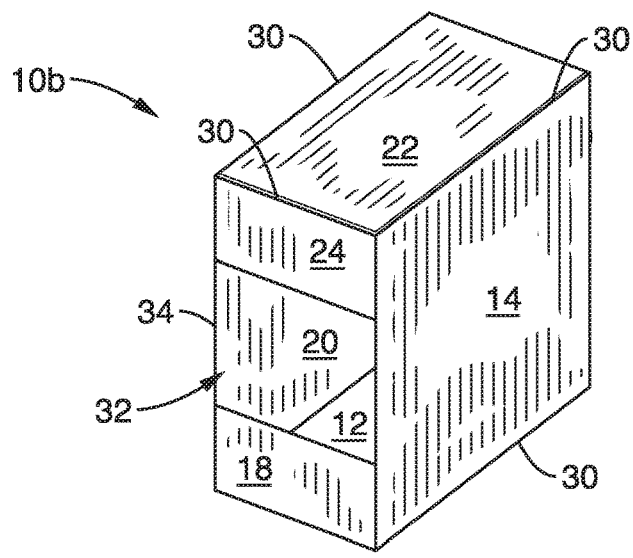
FIG. 3 is a perspective view of the collapsing fuel cell isolator of FIG. 2 after placing all the folds into the correct position to form a fuel cell envelope.

In FIG. 3, rectangular fuel cell isolator 10b is formed by opening up parallelogram 10a (FIG. 2) until it forms a rectangle. Visible faces in FIG. 3 include bottom face 12, side face 14, lower front flap 18, top face 22, side face 14, and upper front flap 24.

At this point, lower front flap 18, lower rear flap 26, upper front flap 24 and upper rear flap 28 may be moved to 90 degree angles, such that they are tangent to side faces 14 and 20. Once in this position, tabs 44 (or other fasteners, not shown) may be employed at the joints between lower front flap 18, lower rear flap 26, upper front flap 24 and upper rear flap 28 with corresponding edges of side faces 14 and 20, where lower front flap 8. Exemplary, fasteners may include tape, clips, and any other suitable means. Where tabs 42 or 44 are employed, the tabs may comprise an adhesive layer and peel-off backing (not shown), such that the backing is removed once locking the faces 12, 14, 20 and 22 and flaps 18, 24, 26 and 28 in an orthogonal orientation (as shown in FIG. 3) is desired.

In practice, initially the lower front flap 18 and upper front flap 24 preferably remain unfolded. After insertion of the fuel cell power generator (not shown) into the interior cavity 32 of the expanded rectangular fuel cell isolator 10b, lower front flap 18 and upper front flap 24 can then be folded and tabs 44 (or other fastener) used to lock flaps 18 and 24 in place orthogonal to side faces 14 and 20.

Figure 4:
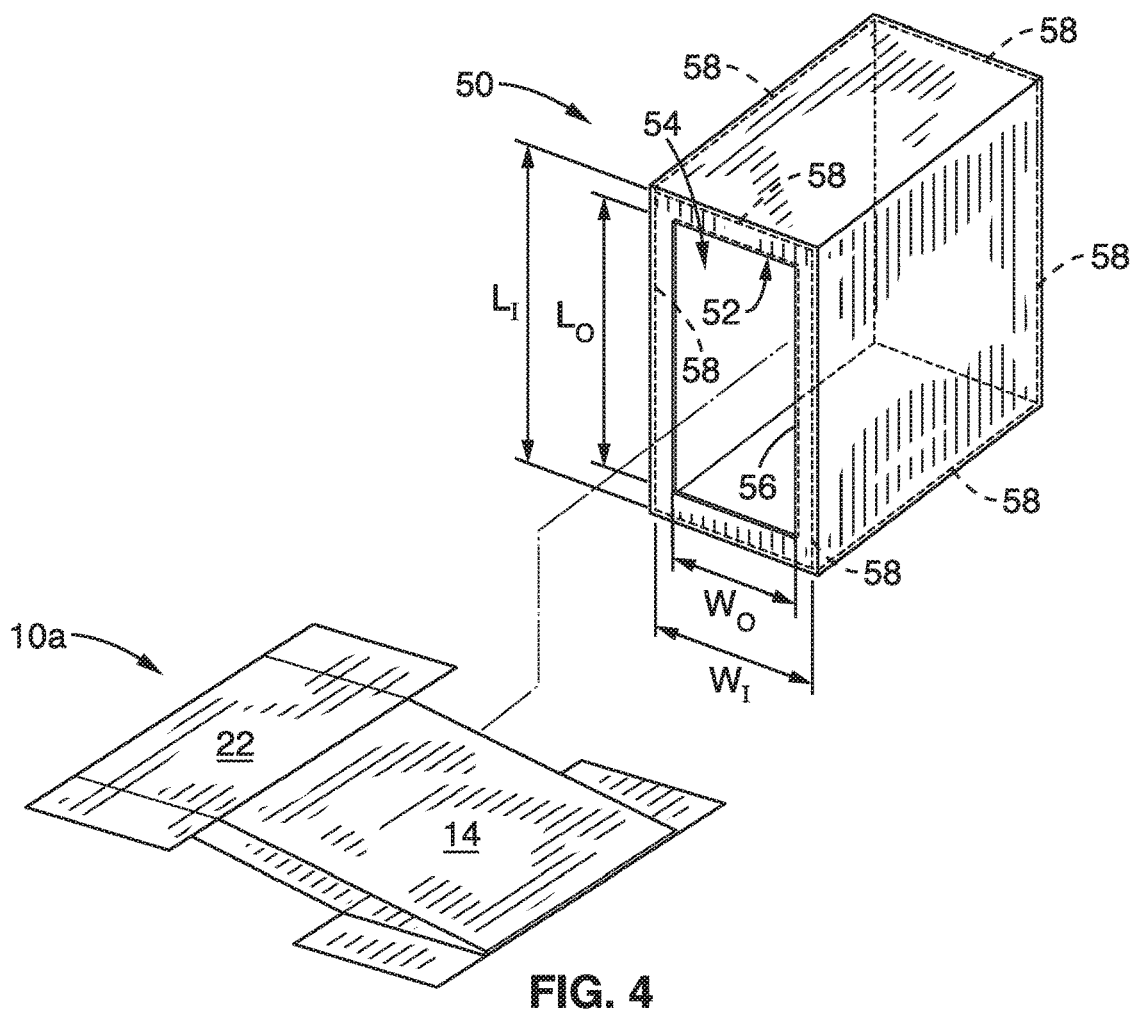
FIG. 4 shows a collapsible isolating envelope of FIG. 2 being inserted in a collapsed configuration into an enclosure.
Figure 5:
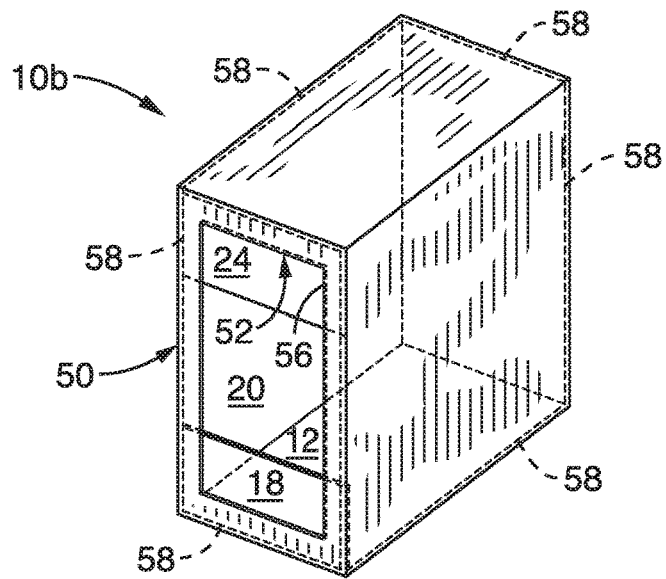
FIG. 5 shows the expanded collapsible isolating envelope disposed in an expanded configuration within the cavity of the enclosure.

FIG. 4 and FIG. 5 illustrate a method of providing a replacement power generator (e.g. a fuel cell) and collapsible isolating envelope for a power plant enclosure in accordance with the present description. FIG. 4 shows a collapsible isolating envelope 10a of FIG. 2 being inserted in a collapsed configuration into an enclosure 50. FIG. 5 shows the expanded collapsible isolating envelope 10b disposed in an expanded configuration within the cavity 54 of the enclosure 50.

As a first step, an existing power generation system (e.g. one or more batteries, not shown) is removed from the enclosure 50 to create the open cavity 54.

As seen in FIG. 4, the enclosure 50 may comprise front borders 56 at the front opening 52 of the enclosure 50. Borders 56 (which may also comprise enclosure doors (not shown)), create an opening 52 that is smaller than the excavated cavity 54 or volume cross-section (e.g. opening width $W_0$ and $L_0$ are smaller than one or more of corresponding cavity width $W_1$ and cavity length $L_1$ defined by inner walls 58. With the rectangular fuel cell isolator in the collapsed, folded parallelogram configuration 10a of FIG. 2, it is able to be positioned into the cavity 54 of the enclosure 50. It may then be expanded such that walls 12, 14 20 and 22 are orthogonal to each other. The fuel cell may then be inserted into the interior cavity 32 of the isolator 10b.

As shown in FIG. 5, the rectangular fuel cell isolator 10b is shown expanded to occupy the interior cavity 54 (fold lines 30 may be sized to be in contact, or nearly contact, inner walls 58) of the enclosure 50. Lower front flap 18 and upper front flap 24 can then be folded and tabs 44 (or other fastener) used to lock flaps 18 and 24 in place orthogonal to side faces 14 and 20. With this configuration, the fuel cell (not shown) may be electrically and thermally insulated from the enclosure walls, and/or other components within enclosure 50, and flaps 18 and 24 are disposed in a configuration to control flow of one or more of one of cooling air, oxidant air, or exhaust gas flow into and out of the cabinet 50 or fuel cell for operation of the fuel cell.

The interior cavity 54, in the occupied state with the fuel cell occupying most, but not all of the internal volume of the isolator 10, is sized to provide a low resistance air flow path guiding and containing one or more of cooling air, oxidant air or exhaust gas flow to maintain thermal states at which the fuel cell is optimized.

From the description herein, it will be appreciated that that the present disclosure encompasses multiple embodiments which include, but are not limited to, the following:

1. A fuel cell isolator for installation into an enclosure, the enclosure configured to contain at least one fuel cell, said fuel cell isolator comprising: a parallelogram-shaped structure generated from a planar sheet of material comprising a plurality of fold lines defining adjacent walls of the parallelogram-shaped structure; wherein the parallelogram-shaped structure comprises a collapsed configuration wherein the adjacent walls are folded about said fold lines such that the adjacent walls are in a non-orthogonal orientation with respect to each other; wherein the parallelogram-shaped structure is configured to be installed into a cavity of said enclosure in said collapsed configuration; wherein the parallelogram-shaped structure is adjustable to expand into an expanded configuration inside said enclosure such that the adjacent walls are unfolded about said fold lines such that adjacent walls are substantially orthogonal to each other in the cavity of the enclosure; wherein an interior of said expanded parallelogram-shaped structure comprises a space for installation of a fuel cell; and wherein when the fuel cell is installed within the expanded configuration of the parallelogram-shaped structure, the parallelogram-shaped structure operates to electrically or thermally insulate the fuel cell from the enclosure.

2. The apparatus or method of any preceding or following embodiment, wherein the parallelogram-shaped structure is configured to both thermally and electrically insulate the fuel cell from the enclosure when installed within the expanded configuration.

3. The apparatus or method of any preceding or following embodiment, wherein the parallelogram-shaped structure is shaped to guide the flow of one or more of one of cooling air, oxidant air, or exhaust gas into and out of the fuel cell or enclosure.

4. The apparatus or method of any preceding or following embodiment, wherein the parallelogram-shaped structure in the expanded configuration forms a substantially rectangular interior cavity having pairs of opposing walls and two open ends; wherein at least one of the open ends may be at least partially closed off by unfolding a pair of opposing flaps each coupled to corresponding walls of one of the pairs of opposing walls via fold lines; and wherein the pair of opposing flaps are unfolded into a substantially orthogonal configuration along the fold lines.

5. The apparatus or method of any preceding or following embodiment, further comprising: one or more fasteners configured for fixing the opposing flaps in the orthogonal configuration.

6. The apparatus or method of any preceding or following embodiment, wherein the enclosure has an opening that is smaller than the parallelogram-shaped structure in the expanded configuration.

7. The apparatus or method of any preceding or following embodiment, wherein the parallelogram-shaped structure is configured to be installed through the opening and into a cavity of said enclosure in the collapsed configuration.

8. A method for replacing a power generator disposed within an enclosure, comprising: removing a first power generator from a cavity of the enclosure; providing a parallelogram-shaped structure generated from a planar sheet of material comprising a plurality of fold lines defining adjacent walls of the parallelogram-shaped structure; wherein the parallelogram-shaped structure comprises a collapsed configuration wherein the adjacent walls are folded about said fold lines such that the adjacent walls are in a non-orthogonal orientation with respect to each other; installing the parallelogram-shaped structure into the cavity of said enclosure in the collapsed configuration; expanding the parallelogram-shaped structure into an expanded configuration inside said enclosure such that the adjacent walls are unfolded about said fold lines such that adjacent walls are substantially orthogonal to each other in the cavity of the enclosure; installing a second power generator into an interior cavity of the expanded parallelogram-shaped structure; and wherein the parallelogram-shaped structure operates to electrically or thermally insulate the second power generator from the enclosure.

9. The apparatus or method of any preceding or following embodiment, wherein the first power generator comprises a battery; and wherein an interior of said expanded parallelogram-shaped structure comprises a space for installation of a fuel cell.

10. The apparatus or method of any preceding or following embodiment, wherein the parallelogram-shaped structure is configured to both thermally and electrically insulate the fuel cell from the enclosure when installed within the expanded configuration.

11. The apparatus or method of any preceding or following embodiment, wherein the parallelogram-shaped structure is shaped to guide the flow of one or more of one of cooling air, oxidant air, or exhaust gas into and out of the fuel cell or enclosure.

12. The apparatus or method of any preceding or following embodiment, wherein the parallelogram-shaped structure in the expanded configuration forms a substantially rectangular interior cavity having pairs of opposing walls and two open ends, wherein at least one of the open ends comprising a pair of opposing flaps coupled to corresponding walls of one of the pairs of opposing walls via fold lines, the method further comprising: unfolding the pair of opposing flaps are into a substantially orthogonal configuration along fold lines to at least partially close off one of the two open ends of the rectangular interior cavity.

13. The apparatus or method of any preceding or following embodiment, further comprising: fixing the opposing flaps in the orthogonal configuration with one or more fasteners.

14. The apparatus or method of any preceding or following embodiment, wherein the enclosure has an opening that is smaller than the parallelogram-shaped structure in the expanded configuration.

15. The apparatus or method of any preceding or following embodiment, wherein the parallelogram-shaped structure is installed through the opening and into a cavity of said enclosure in the collapsed configuration.

16. An installation kit for replacing one or more batteries within an enclosure of an external power plant with a fuel cell, comprising: a fuel cell isolator in the form of a parallelogram-shaped structure generated from a planar sheet of material comprising a plurality of fold lines defining adjacent walls of the parallelogram-shaped structure; wherein the parallelogram-shaped structure comprises a collapsed configuration wherein the adjacent walls are folded about said fold lines such that the adjacent walls are in a non-orthogonal orientation with respect to each other; wherein the parallelogram-shaped structure is configured to be installed into a cavity of said enclosure in said collapsed configuration, said cavity being formed at least in part from removal of the one or more batteries from the enclosure; wherein the parallelogram-shaped structure is adjustable to expand into an expanded configuration inside said enclosure such that the adjacent walls are unfolded about said fold lines such that adjacent walls are substantially orthogonal to each other in the cavity of the enclosure; wherein an interior of said expanded parallelogram-shaped structure comprises a space for installation of the fuel cell; and wherein when the fuel cell is installed within the expanded configuration of the parallelogram-shaped structure, the parallelogram-shaped structure operates to electrically or thermally insulate the fuel cell from the enclosure.

17. The apparatus or method of any preceding or following embodiment, wherein the parallelogram-shaped structure is configured to both thermally and electrically insulate the fuel cell from the enclosure when installed within the expanded configuration.

18. The apparatus or method of any preceding or following embodiment, wherein the parallelogram-shaped structure is shaped to guide the flow of one or more of one of cooling air, oxidant air, or exhaust gas into and out of the fuel cell or enclosure.

19. The apparatus or method of any preceding or following embodiment, wherein the parallelogram-shaped structure in the expanded configuration forms a substantially rectangular interior cavity having pairs of opposing walls and two open ends; wherein at least one of the open ends may be at least partially closed off by unfolding a pair of opposing flaps each coupled to corresponding walls of one of the pairs of opposing walls via fold lines; and wherein the pair of opposing flaps are unfolded into a substantially orthogonal configuration along the fold lines.

20. The apparatus or method of any preceding or following embodiment, further comprising: one or more fasteners configured for fixing the opposing flaps in the orthogonal configuration.

21. The apparatus or method of any preceding or following embodiment, wherein the enclosure has an opening that is smaller than the parallelogram-shaped structure in the expanded configuration.

22. The apparatus or method of any preceding or following embodiment, wherein the parallelogram-shaped structure is configured to be installed through the opening and into a cavity of said enclosure in the collapsed configuration.

23. A fuel cell isolator for installation into an enclosure, the enclosure configured to contain at least one fuel cell, said fuel cell isolator comprising: a parallelogram-shaped structure to be installed in a collapsed configuration into said enclosure; wherein the parallelogram-shaped structure in the collapsed configuration is formed from a sheet of flat material; wherein the parallelogram-shaped structure is configured to be install into said enclosure in said collapsed configuration; wherein the parallelogram-shaped structure is adjustable to expand into an expanded configuration for mounting inside said enclosure as a parallelogram; wherein an interior of said expanded parallelogram-shaped structure comprises space for installation of a fuel cell, such that said fuel cell, wherein when installed within the expanded configuration of the collapsible fuel cell isolator, the fuel cell is electrically or thermally isolated from said enclosure.

24. The apparatus or method of any preceding or following embodiment, wherein the parallelogram-shaped structure is both thermally and electrically insulating such that the fuel cell, when installed within the expanded configuration of the collapsible fuel cell isolator, is electrically or thermally isolated from said enclosure.

25. The apparatus or method of any preceding or following embodiment, wherein the parallelogram-shaped structure is shaped to guide the flow of at least one of coolant, oxidant, or exhaust gases into or out of said fuel cell.

26. The apparatus or method of any preceding or following embodiment, wherein the parallelogram-shaped structure forming a substantially rectangular fuel cell installation cavity, where said rectangular fuel cell installation cavity has two open ends, which may be partially closed off by further foldable members formed from said first flat material.

27. The apparatus or method of any preceding or following embodiment, further comprising fastening means for maintaining further foldable members in a desired fixed position such that the open ends of said substantially rectangular fuel cell installation cavity are partially closed off.

28. The apparatus or method of any preceding or following embodiment, the fuel cell isolator configured as an expandable parallelogram forming a substantially rectangular fuel cell installation cavity, where said rectangular fuel cell installation cavity has two open ends, which may be partially closed off by further foldable members formed from said first flat material.

29. The apparatus or method of any preceding or following embodiment, further comprising fastening means for maintaining further foldable members in a desired fixed position such that the open ends of said substantially rectangular fuel cell installation cavity are partially closed off.

30. The apparatus or method of any preceding or following embodiment, wherein the collapsible fuel cell isolator further acts to guide cooling air into, and exhaust air out of, said enclosure.

31. A method of installing a fuel cell into an enclosure, comprising: collapsing a folding collapsible fuel cell isolator into a flat sheet or parallelogram, where collapsible fuel cell isolator is formed of electrically and thermally insulating material; placing said collapsed folded collapsible fuel cell isolator into said enclosure; opening up said collapsed folded collapsible fuel cell isolator such that it forms a substantially rectangular cavity in its interior; mounting said rectangular folded collapsible fuel cell isolator in said enclosure; and inserting said fuel cell into the interior of rectangular folded collapsible fuel cell isolator; wherein the fuel cell is substantially in electrical and thermal isolation from said enclosure upon insertion into the interior of rectangular folded collapsible fuel cell isolator.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An isolating envelope for an enclosure, comprising:
an isolator in the form of a parallelogram-shaped structure generated from a planar sheet of material comprising a plurality of flexible fold lines defining adjacent walls of the parallelogram-shaped structure;
wherein the parallelogram-shaped structure comprises a collapsed configuration with the adjacent walls folded about said fold lines such that the adjacent walls are in a non-orthogonal orientation with respect to each other;
wherein the parallelogram-shaped structure is capable of being installed into a cavity of an enclosure in said collapsed configuration and expanded into an expanded configuration within said cavity;
wherein the parallelogram-shaped structure is adjustable to expand into an expanded configuration inside said enclosure such that the adjacent walls are unfolded about said fold lines such that adjacent walls are substantially orthogonal to each other in the cavity of the enclosure;
wherein the parallelogram-shaped structure in the expanded configuration forms a substantially rectangular interior having pairs of opposing walls and two open ends;
wherein at least one of the open ends may be at least partially closed off by unfolding a pair of opposing flaps each coupled to corresponding walls of one of the pairs of opposing walls via fold lines;
wherein the pair of opposing flaps are unfolded into a substantially orthogonal configuration along the fold lines; and
wherein the expanded configuration of the parallelogram-shaped structure installed within the enclosure operates to electrically or thermally insulate the interior of the expanded structure from the cavity of the enclosure.

2. The isolating envelope of claim 1, wherein the parallelogram-shaped structure is configured to both thermally and electrically insulate the interior of the expanded structure from the cavity of the enclosure.

3. The isolating envelope of claim 1, wherein the open ends of the expanded parallelogram-shaped structure permit the flow of one or more of one of cooling air, oxidant air, or exhaust gas into and out of the interior of the expanded structure.

4. The isolating envelope of claim 1, further comprising: one or more fasteners capable of fixing the opposing flaps in the orthogonal configuration.

5. The isolating envelope of claim 1, wherein the enclosure has an opening that is smaller than the interior cavity of the enclosure and the parallelogram-shaped structure installed in the expanded configuration.

6. The isolating envelope of claim 5, wherein the parallelogram-shaped structure is sized to be installed through the opening and into a cavity of said enclosure in the collapsed configuration.

* * * * *